US007967683B2

United States Patent
Chuang

(10) Patent No.: US 7,967,683 B2
(45) Date of Patent: Jun. 28, 2011

(54) STABILIZING MECHANISM FOR OUTPUT TORQUE OF A TRANSMISSION MEMBER

(76) Inventor: Chia-Chiung Chuang, Taichung (TW)

( * ) Notice: Subject to any disclaimer, the term of this patent is extended or adjusted under 35 U.S.C. 154(b) by 457 days.

(21) Appl. No.: 12/048,918

(22) Filed: Mar. 14, 2008

(65) Prior Publication Data

US 2009/0104998 A1 Apr. 23, 2009

(30) Foreign Application Priority Data

Oct. 19, 2007 (TW) .............................. 96139287 A

(51) Int. Cl.
*F16D 7/04* (2006.01)
(52) U.S. Cl. ............................................ 464/39; 81/475
(58) Field of Classification Search .................... 464/38, 464/39; 81/473–476
See application file for complete search history.

(56) References Cited

U.S. PATENT DOCUMENTS

| | | | | | |
|---|---|---|---|---|---|
| 1,828,370 | A | * | 10/1931 | Huddle | 464/39 |
| 2,012,916 | A | * | 8/1935 | Pott | 173/93.6 |
| 2,174,342 | A | * | 9/1939 | Greulich | 464/39 |
| 2,634,640 | A | * | 4/1953 | Pedersen | 81/475 |
| 3,695,059 | A | * | 10/1972 | Laubach | 464/23 |
| 4,062,203 | A | * | 12/1977 | Leonard et al. | 464/38 |
| 4,272,973 | A | * | 6/1981 | Fu-Tsai | 464/23 |
| 4,346,633 | A | * | 8/1982 | Rendl | 81/475 |
| 4,371,354 | A | * | 2/1983 | McKean | 464/36 |
| 4,630,512 | A | * | 12/1986 | Durr | 81/475 |
| 4,947,714 | A | * | 8/1990 | Fluri | 81/475 |
| 4,964,319 | A | * | 10/1990 | Chang | 81/58.3 |
| 5,094,330 | A | * | 3/1992 | Lee | 464/39 |
| 5,813,298 | A | * | 9/1998 | Beattie | 81/475 |
| 6,024,180 | A | | 2/2000 | Lin | |
| 7,025,151 | B2 | * | 4/2006 | Hehli et al. | 173/176 |
| 7,032,481 | B2 | * | 4/2006 | Li et al. | 81/429 |
| 7,281,458 | B2 | | 10/2007 | Chuang | |
| 2006/0185481 | A1 | * | 8/2006 | Mikiya et al. | 81/475 |
| 2006/0236827 | A1 | * | 10/2006 | Chiu et al. | 81/475 |
| 2007/0267266 | A1 | * | 11/2007 | Lee-Liao | 192/56.61 |
| 2008/0015034 | A1 | * | 1/2008 | Downey | 464/39 |
| 2008/0087146 | A1 | * | 4/2008 | Gao | 81/474 |

FOREIGN PATENT DOCUMENTS

JP 02256470 A * 10/1990

\* cited by examiner

*Primary Examiner* — Aaron Dunwoody
(74) *Attorney, Agent, or Firm* — Guice Patents PLLC

(57) ABSTRACT

A stabilizing mechanism for output torque of a transmission member, including: a transmission member having a force-input section and a force-output section which are separated from each other; an engaging member positioned between the force-input section and the force-output section, the engaging member including a first engaging section and a second engaging section respectively disposed on the force-input section and the force-output section in predetermined positions, the first and second engaging sections being engaged with each other by a predetermined engagement depth for transmitting force from the force-input section to the force-output section; and a resilient member for providing resilient force to keep the first and second engaging sections engaged with each other. The resilient member is compressible under force. The resilient member has a compressible distance shorter than the engagement depth of the first and second engaging sections.

7 Claims, 7 Drawing Sheets

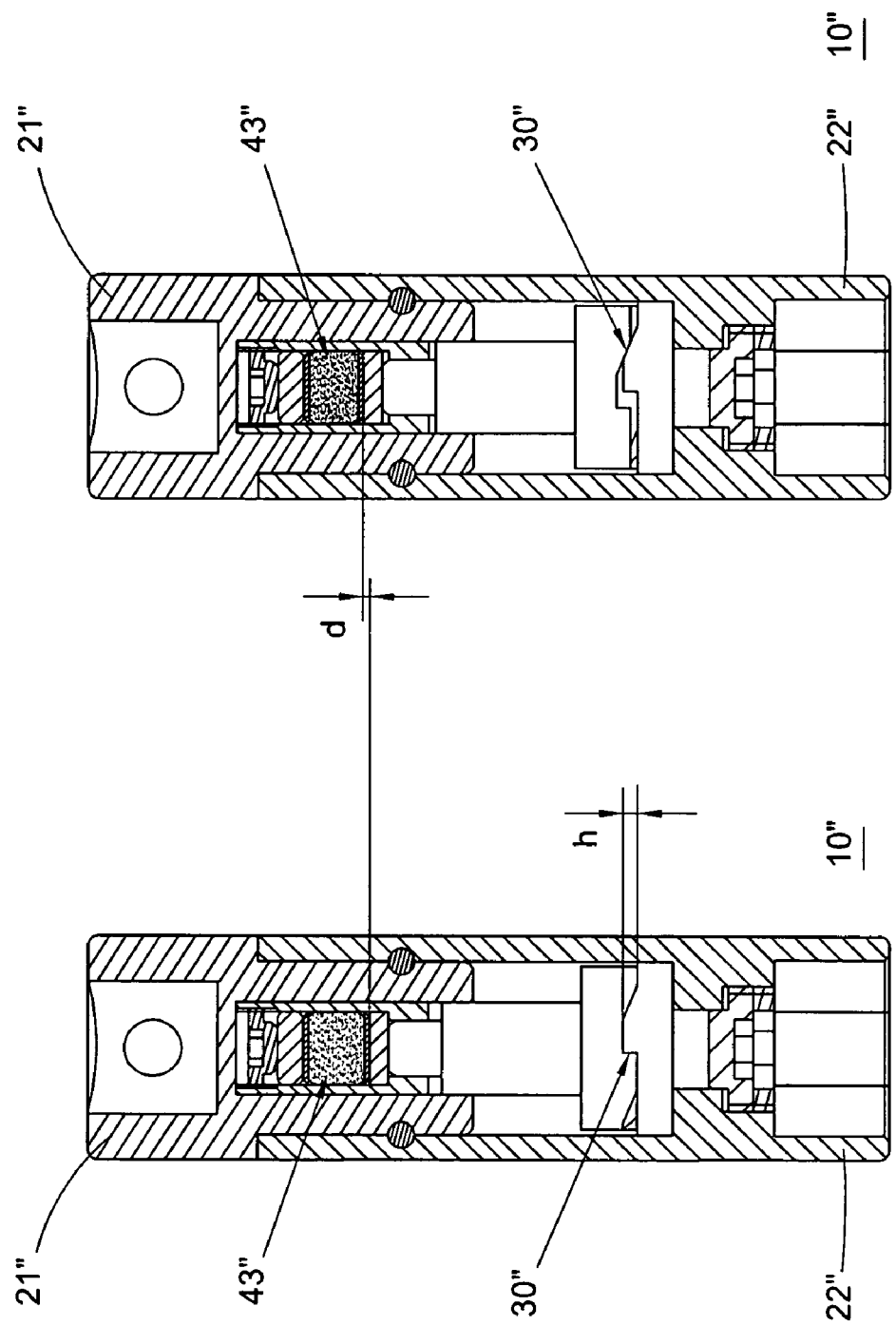

STABILIZING MECHANISM FOR OUTPUT TORQUE OF A TRANSMISSION MEMBER

BACKGROUND OF THE INVENTION

The present invention is related to a transmission technique of tools, and more particularly to a stabilizing mechanism for output torque of a transmission member.

It is known that high-pressure gas serves as the power source of some kinds of tools. For example, U.S. Pat. No. 6,024,180 discloses a pneumatic wrench having an output shaft. One end of the output shaft is drivable by an impact mechanism (such as double-hammer type and pin-clutch type) of the pneumatic wrench, whereby the output shaft can rotate and operate. The other end of the output shaft extends out of the housing of the pneumatic wrench for outputting power. In addition, U.S. Pat. No. 7,281,458 discloses a transmission shaft applicable to unspecific power or non-power tools. The transmission shaft is designed with torque-limiting protective effect.

It is found by this applicant that both the above conventional techniques apparently lack stabilizing/controlling system for the output torque. For example, the output shaft of U.S. Pat. No. 6,024,180 can only truly transfer the force provided by the hammering mechanism to outer side. Accordingly, the output torque is unstable. This is unsuitable for those working fields necessitating stable torque. With respect to U.S. Pat. No. 7,281,458, the transmission shaft is designed with torque-limiting protective effect. However, only when the application force exceeds the nominal transmitted torque, the engagement structure of the transmission shaft will jump aside to interrupt the transmission of torque. This is not helpful in stabilizing the output torque. That is, the value of the output torque under the nominal transmitted torque value is still unstable. Therefore, U.S. Pat. Nos. 6,024,180 and 7,281,458 have the same shortcoming.

SUMMARY OF THE INVENTION

It is therefore a primary object of the present invention to provide a stabilizing mechanism for output torque of a transmission member. The stabilizing mechanism serves to stabilize the force transmitted by the transmission member and restrict the output torque within a certain range.

According to the above object, the stabilizing mechanism for output torque of the transmission member of the present invention includes: a transmission member having a force-input section and a force-output section which are separated from each other; an engaging member positioned between the force-input section and the force-output section, the engaging member including a first engaging section and a second engaging section respectively disposed on the force-input section and the force-output section in predetermined positions, the first and second engaging sections being engaged with each other by a predetermined engagement depth for transmitting force from the force-input section to the force-output section; and a resilient member for providing resilient force to keep the first and second engaging sections engaged with each other. The resilient member is compressible under force. The resilient member has a compressible distance shorter than the engagement depth of the first and second engaging sections.

The present invention can be best understood through the following description and accompanying drawings wherein:

BRIEF DESCRIPTION OF THE DRAWINGS

FIG. 8 is a sectional view of a third embodiment of the present invention; and

FIG. 9 is a sectional view according to FIG. 8, showing that the resilient member is compressed to a maximum extent.

DETAILED DESCRIPTION OF THE PREFERRED EMBODIMENTS

Figure 1:
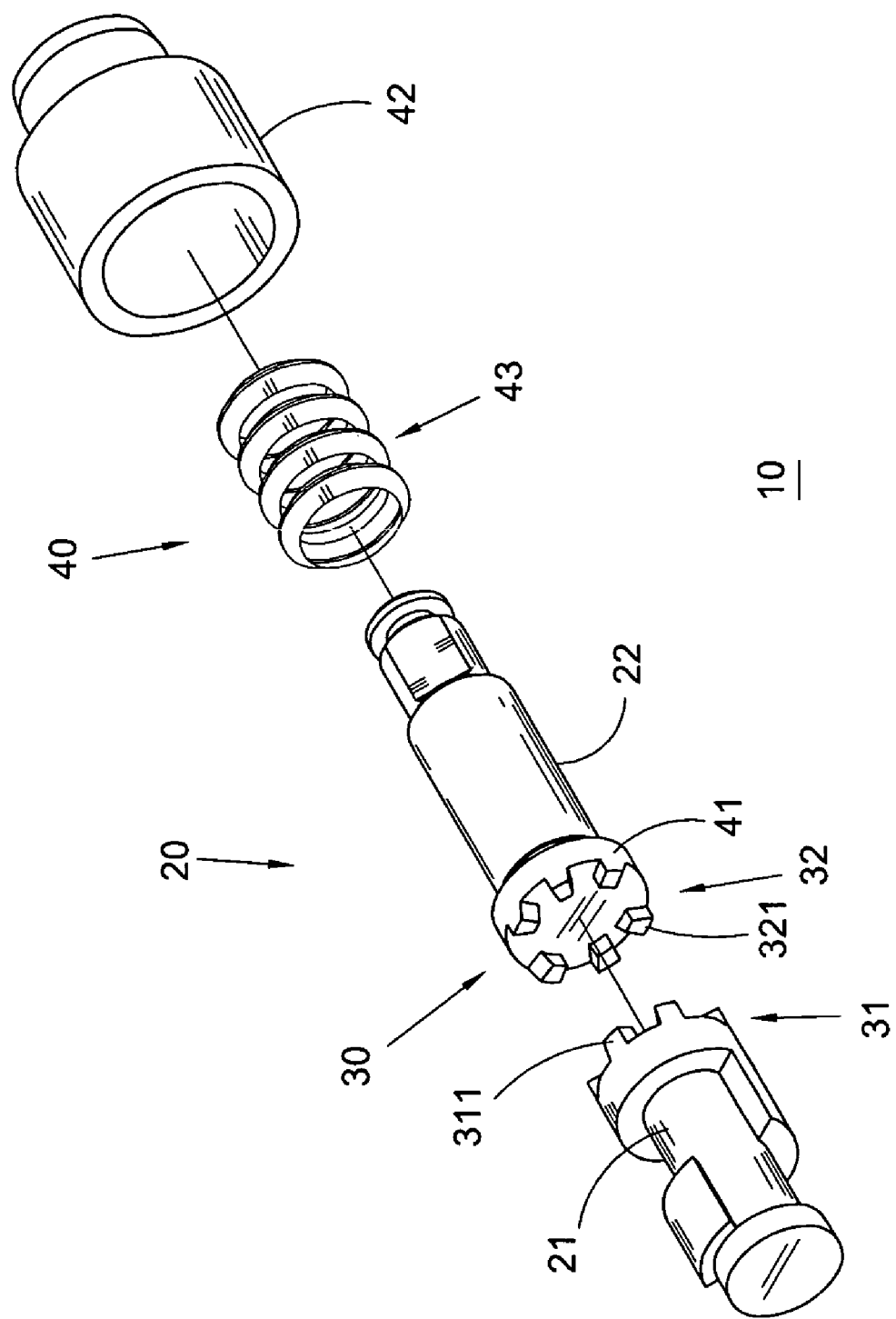
FIG. 1 is a perspective exploded view of a first embodiment of the present invention.
Figure 2:
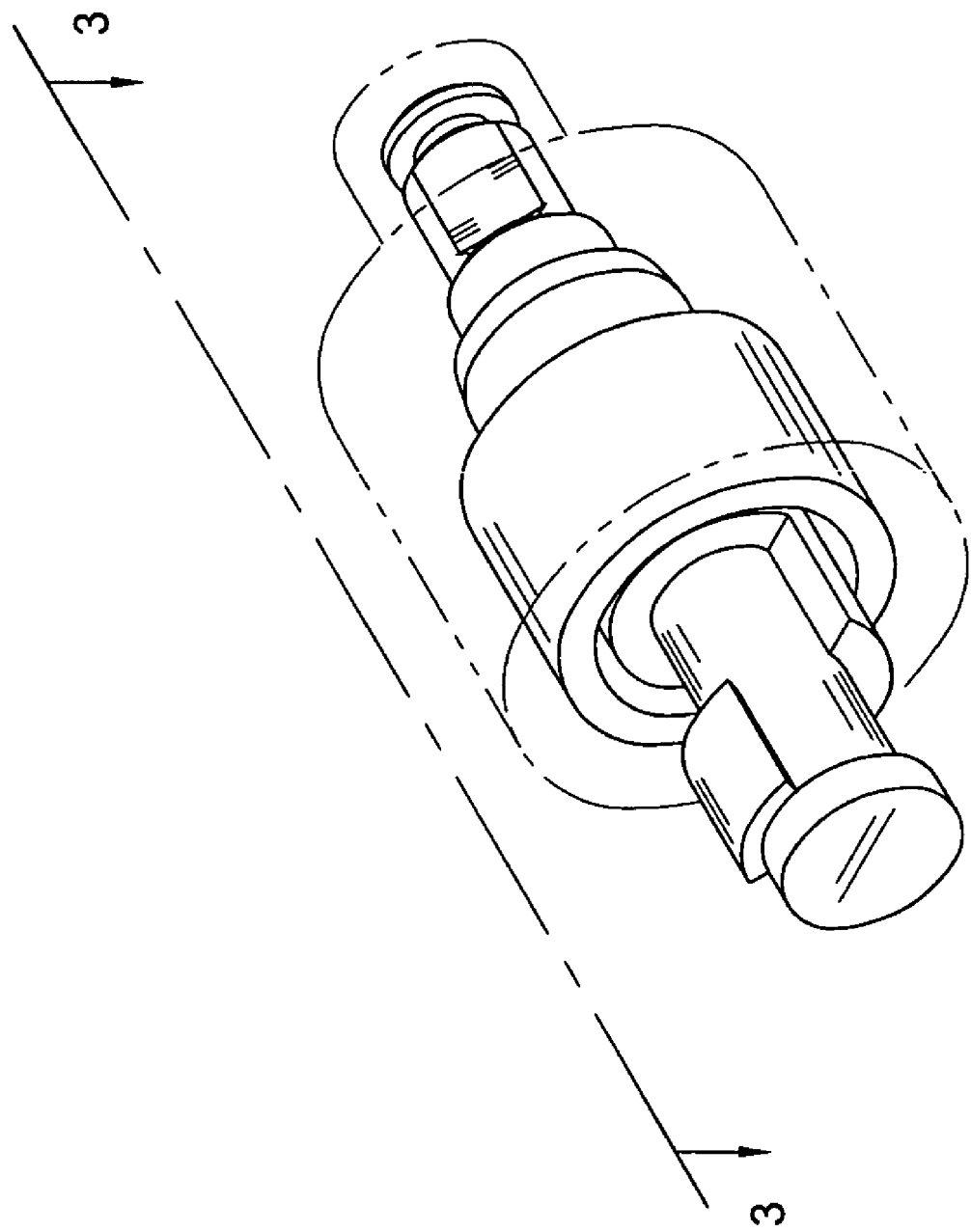
FIG. 2 is a perspective assembled view of the first embodiment of the present invention.
Figure 3:
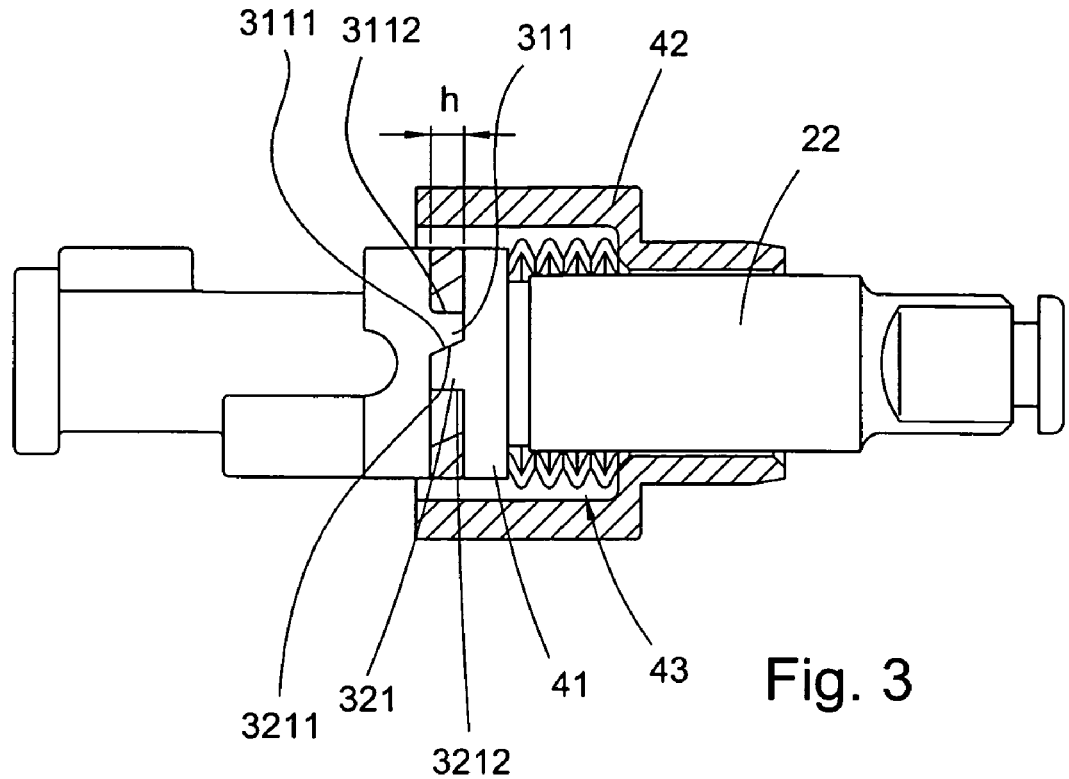
FIG. 3 is a sectional view taken along line 3-3 of FIG. 2.
Figure 4:
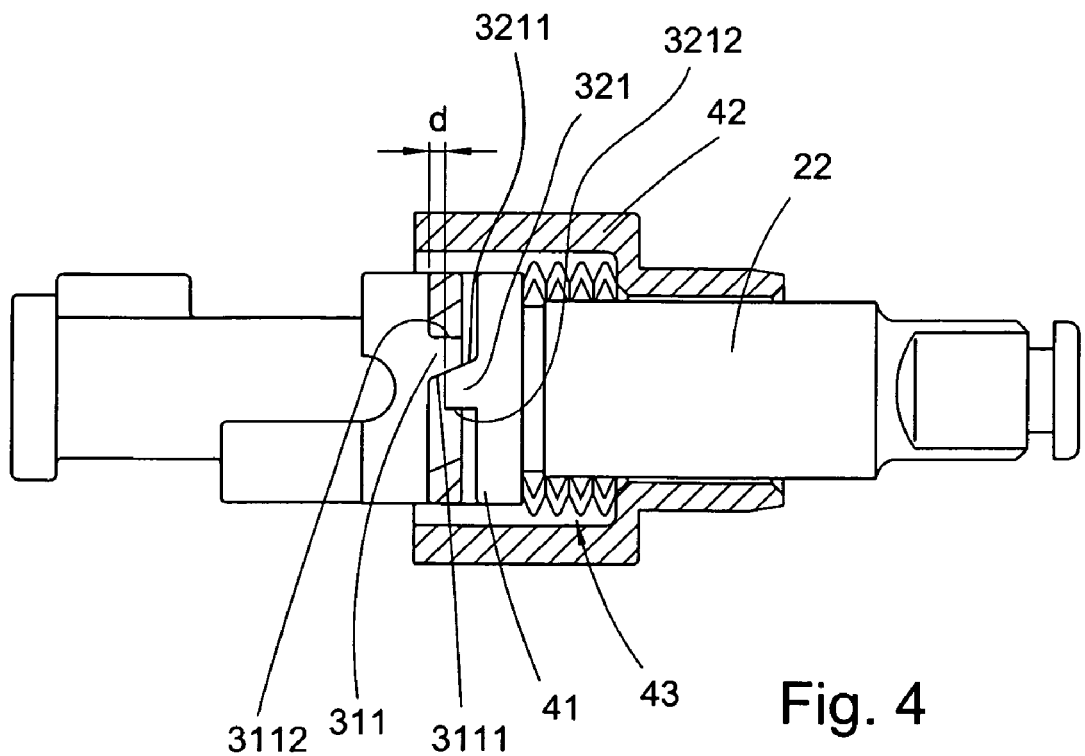
FIG. 4 is a sectional view according to FIG. 3, showing that the resilient member is compressed to a maximum extent.

Please refer to FIGS. 1 to 4. The first embodiment of the stabilizing mechanism 10 for output torque of the transmission member of the present invention includes a transmission member 20, an engaging member 30 and a resilient member 40.

The transmission member 20 includes a force-input section 21 in form of cylindrical shaft and a force-output section 22 also in form of cylindrical shaft. The force-input section 21 and the force-output section 22 are concentrically arranged. One end of the force-input section 21 is opposite to one end of the force-output section 22. In general, the transmission member 21 is used in the same way as the conventional output shaft. In other words, the other end of the force-input section 21 is hammered by a hammering mechanism to rotate the force-input section 21. However, the force-output section 22 is quite different from the conventional one-piece output shaft. The force-input section 21 and the force-output section 22 are separable from each other.

The engaging member 30 includes a first engaging section 31 and a second engaging section 32 respectively fixedly disposed on the opposite end faces of the force-input section 21 and the force-output section 22. The first and second engaging sections 31, 32 engage with each other by a predetermined engagement depth h. By means of the engagement between the first and second engaging sections 31, 32, the force can be transmitted from the force-input section 21 to the force-output section 22.

To speak more detailedly, the first engaging section 31 has multiple ratchets 311 annularly arranged on the end face of the force-input section 21 at intervals about the curvature center of the transmission member 20. The ratchets 311 axially project from the end face of the force-input section 21. Each ratchet 311 has an inclined tooth face 3111 on one side, which is inclined from the axis of the transmission member 20 and a normal tooth face 3112 on the other side, which is parallel to the axis of the transmission member 20.

The second engaging section 32 has multiple ratchets 321 annularly arranged on the end face of the force-output section 22 at intervals about the curvature center of the transmission member 20. The ratchets 321 axially project from the end face of the force-output section 22. Each ratchet 321 is inserted between two adjacent ratchets 311 of the first engaging section 31. Each ratchet 321 also has an inclined tooth face 3211 on one side, which is inclined from the axis of the transmission member 20 and a normal tooth face 3212 on the other side, which is parallel to the axis of the transmission member 20. The inclined tooth faces 3211 of the ratchets 321 of the second engaging section 32 respectively abut against the inclined tooth faces 3111 of the corresponding ratchets 311 of the first engaging section 31.

The resilient member 40 has an annular seat 41 coaxially fixedly disposed on a circumference of one end of the force-output section 22. The resilient member 40 further has an annular end section 42 slidably fitted on the other end of the force-output section 22 and spaced from one end of the force-input section 21 by a fixed distance. The end section 42 is separated from the seat 41. The resilient member 40 further includes a resilient section 43 composed of multiple stacked tray-type washers. The resilient section 43 is coaxially fitted around the shaft body of the force-output section 22. One end of the resilient section 43 abuts against the end section 42, while the other end of the resilient section 43 abuts against the seat 41. Accordingly, the resilient section 43 can provide resilient force transmitted from the seat 41 to the engaging member 30. Therefore, the first and second engaging sections 31, 32 are resiliently kept in an engaging state. Importantly, although the resilient section 43 is compressible under force, the maximum compressible distance d between the seat 41 and the end section 42 is shorter than the engagement depth h. Therefore, when compressing the resilient section 43, the force-output section 22 is axially moved to change the engagement depth of the first and second engaging sections 31, 32. However, in any case, the first and second engaging sections 31, 32 are kept engaging with each other to transmit the force from the force-input section 21 to the force-output section 22.

According to the above arrangement, when the force-input section 21 is forced to clockwise forward rotate, through the inclined tooth faces 3111, 3211 of the first and second engaging sections, the force is transmitted to the force-output section 22. Accordingly, the force-output section 22 is synchronously rotated in the same direction. However, in the case that the force applied to the force-input section 21 is excessively great, the resilient section 43 is compressed and retreated. At this time, the inclined tooth faces 3111, 3211 slide relative to each other, while keeping abutting against each other. Accordingly, the excessively great force is prevented from being fully transmitted to the force-output section 22. Therefore, the output torque of the transmission member is stabilized.

On the other hand, when the force-input section 21 is forced to counterclockwise backward rotate, the normal tooth faces 3112, 3212 of the first and second engaging sections 31, 32 abut against each other to fully transmit the force applied to the force-input section 21 to the force-output section 22. That is, under such circumstance, no component force is applied to the resilient section 43 so that the resilient section 43 will not be compressed and retreated.

It should be specially noted that in comparison with the conventional torque control system employing ratchets and ball bodies as the engaging structures, for example, Taiwanese Patent Nos. 094131818, 095124015 and 094221853, the present invention is not mainly characterized by the engaging structures. Instead, the present invention is characterized by the relationship between the compressible extent of the resilient section 43 and the engagement depth. To speak more substantially, the conventional techniques also disclose springs, tray-type washers and compressible fluid to provide resilient force. However, such measures serve to directly disengage the engaging structures which are originally engaged with each other so as to interrupt the transmission of the force and restrict the torque. In contrast to the conventional techniques, the resilient member of the present invention provides suitable resilient force in precondition of maintenance of engagement between the first and second engaging sections. The first and second engaging sections can only relatively displace by a distance shorter than the engagement depth h. Therefore, the excessively great action force is absorbed by the resilient section 43 so as to stabilize the output torque of the transmission member. Obviously, the technical characteristic of the present invention is quite different from that of prior art.

The present invention is mainly characterized in that the compressible distance d of the resilient member is shorter than the engagement depth h between the first and second engaging sections. Therefore, the characteristic of the present invention is not the way how the force-input section 21 is impacted and how the force-output section 22 outputs force. Substantially, the impact mechanism exerting force onto the force-input section is not limited to the aforesaid double-hammer type or pin-clutch type. Also, the structure of the other end of the force-output section, which is connected to external part, is not limited to a square end. Any other suitable structure can be used to transmit the force to outer side. In other word, many modifications of the force-input section and force-output section can be made without departing from the spirit of the present invention.

According to the first embodiment, when the resilient section 43 is retreated, the force-output section 22 is axially moved. Under such circumstance, in use of the tool, a shaking state may take place. Such shaking is undesired and must be avoided in some working fields. Therefore, a second embodiment of the present invention provides a stabilizing mechanism 10' free from any shaking state.

Figure 5:
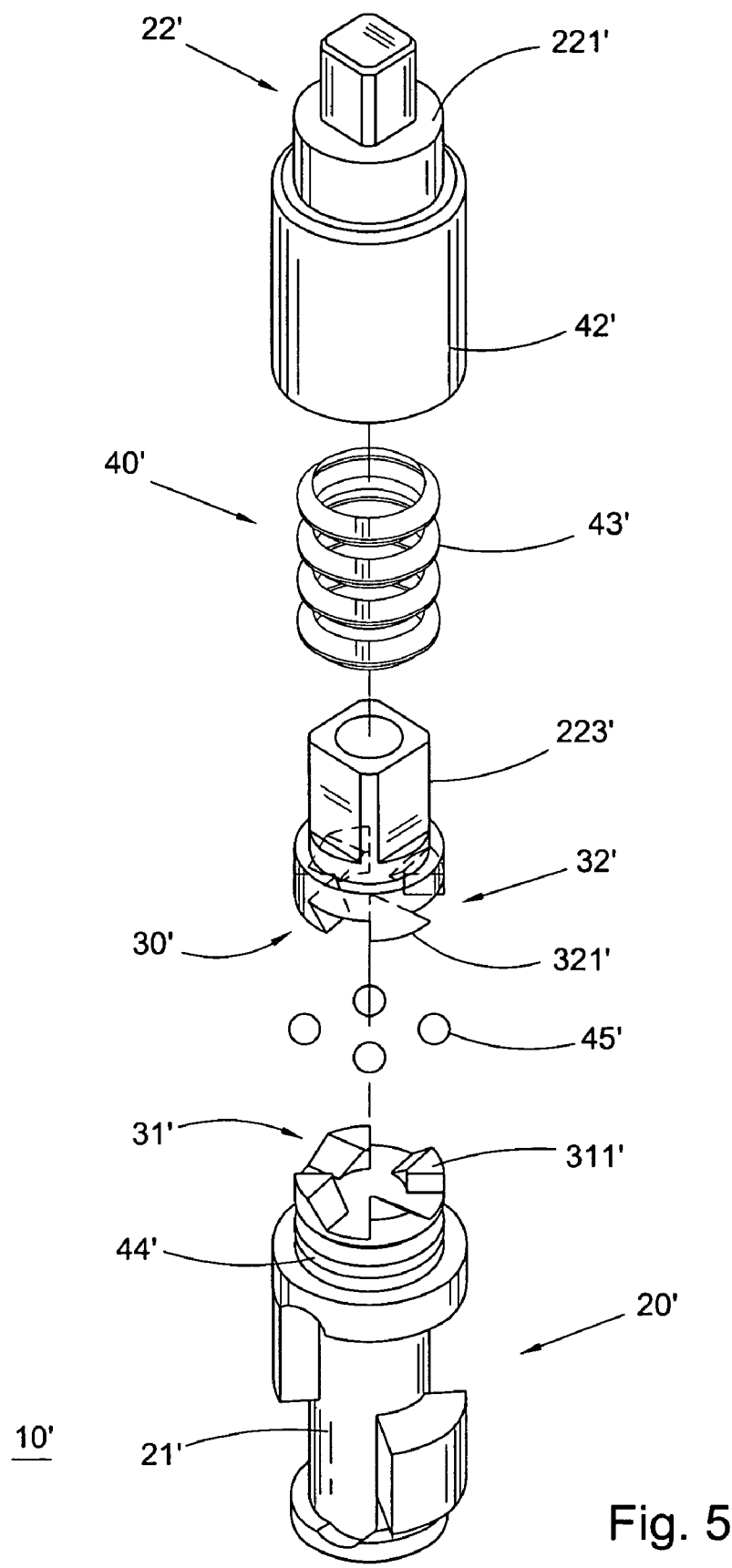
FIG. 5 is a perspective exploded view of a second embodiment of the present invention.
Figure 6:
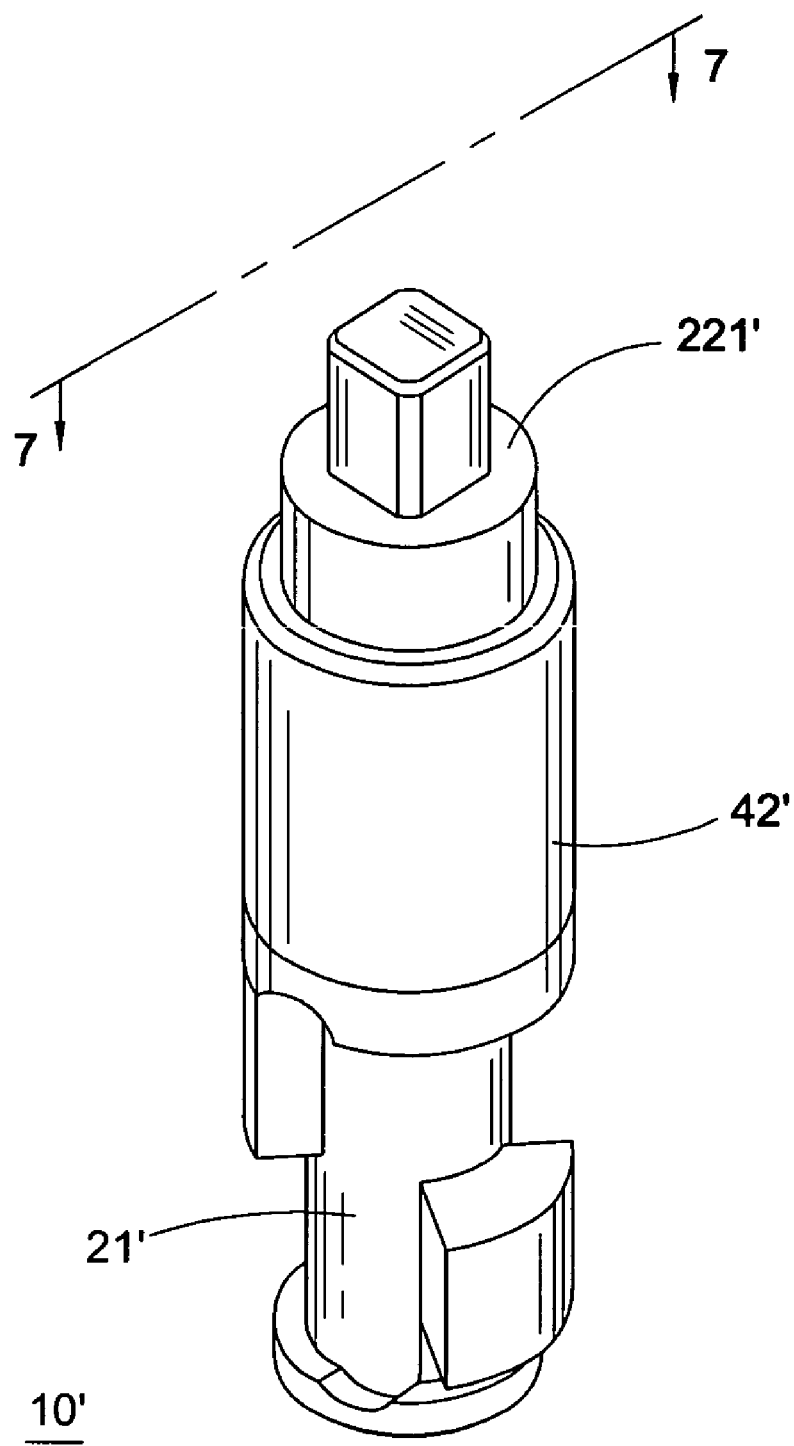
FIG. 6 is a perspective assembled view of the second embodiment of the present invention.
Figure 7:
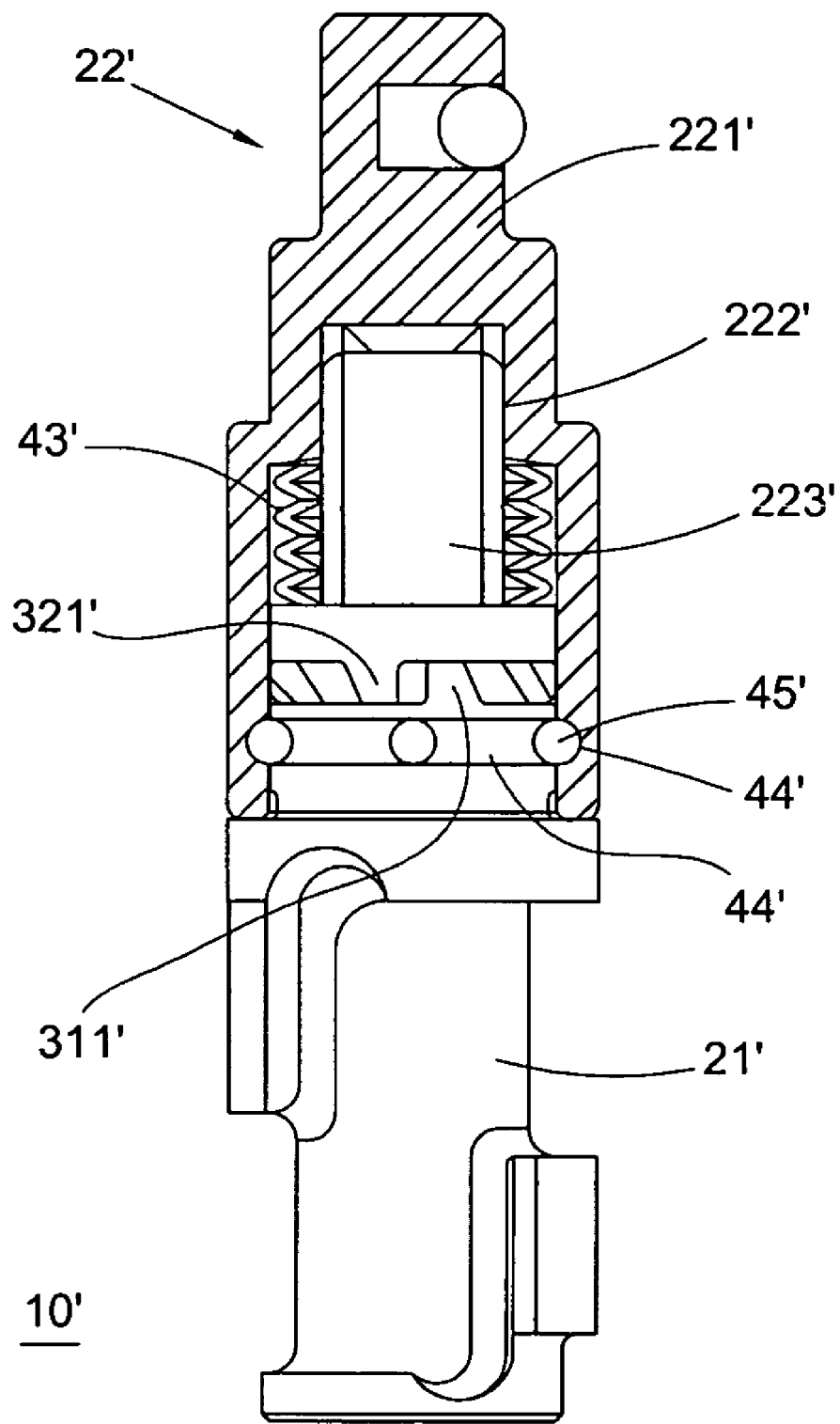
FIG. 7 is a sectional view taken along line 7-7 of FIG. 6.

FIGS. 5 to 7 show the second embodiment of the present invention. In order to avoid the shaking of the force-output section, the second embodiment is different from the first embodiment in that the force-output section 22' has a cylindrical outer cap body 221'. A chucking hole 222' with non-circular cross-section is formed at one end of the outer cap body 221'. The chucking hole 222' axially inward extends from the end of the outer cap body 221' by a certain depth. One end of an inner chucking column 223' is coaxially slidably fitted in the chucking hole 222'. The inner chucking column 223' has a cross-sectional shape complementary to that of the chucking hole 222' so that the inner chucking column 223' is coaxially fitted in the outer cap body 221'. The inner chucking column 223' and the outer cap body 221' are axially movable relative to each other. The end of the inner chucking column 223' is chucked in the noncircular chucking hole 222' so that the outer cap body 221' cannot rotate about the inner chucking column 223'.

One end of the annular end section 42' of the resilient member 40' is coaxially integrally connected with the end of the outer cap body 221'. An arced annular (not shown) is formed on inner wall face of the other end of the end section 42'. Another arced annular groove 44' is formed on a circumference of one end of the force-input section 21'. The two annular grooves 44' have the same curvature center and are positioned opposite to each other. Multiple balls 45' are rollably held in the two annular grooves 44', whereby the end section 42' is spaced from the end of the force-input section 21' by a fixed gap. In addition, the outer cap body 221' of the force-output section 22' is located.

The engaging member 30' includes a first engaging section 31' and a second engaging section 32' respectively fixedly disposed on the opposite end faces of the force-input section 21' and the force-output section 22'. The first and second engaging sections 31', 32' engage with each other by a predetermined engagement depth. By means of the engagement between the first and second engaging sections 31', 32', the force can be transmitted from the force-input section 21' to the force-output section 22'.

The first engaging section 31' has multiple ratchets 311' annularly arranged on the end face of the force-input section 21' at intervals about the curvature center of the transmission member 20'. The ratchets 311' axially project from the end face of the force-input section 21'. Each ratchet 311' has an inclined tooth face on one side, which is inclined from the axis of the transmission member 20' and a normal tooth face on the other side, which is parallel to the axis of the transmission member 20'.

The second engaging section 32' has multiple ratchets 321' annularly arranged on the end face of the force-output section 22' at intervals about the curvature center of the transmission member 20'. The ratchets 321' axially project from the end face of the force-output section 22'. Each ratchet 321' is inserted between two adjacent ratchets 311' of the first engaging section 31'.

According to the above arrangement, the stabilizing mechanism 10' is able to provide stabilizing effect for the output torque as the first embodiment. In addition, when the resilient section 43' of the resilient member 40' is forced and retreated, the inner chucking column 223' is axially moved, while the distance between the other end of the outer cap body 221' and the force-input section 21' of the transmission member 20' is not changed. Therefore, the shaking state can be avoided to meet the requirements of some specific working fields.

It should be noted that the above two embodiments are described with the output shaft of a pneumatic wrench exemplified. However, the scope of the present invention is not limited to such output shaft. The application of the present invention is wider.

FIGS. 8 and 9 show a third embodiment of the present invention, in which the stabilizing mechanism 10" substantially has the same components and space pattern as Taiwanese Patent No. 095100425. However, the present invention is different from the above Patent in that the maximum compressible distance d of the resilient member of the present invention is shorter than the engagement depth h. That is, in the third embodiment, the first and second engaging sections of the engaging member 30" are always engaged with each other without jumping aside which will take place according to the above Patent. This makes the effect of the third embodiment of the present invention totally different from that of the above Patent The third embodiment of the present invention can also avoid the shaking state as the second embodiment.

The above embodiments are only used to illustrate the present invention, not intended to limit the scope thereof. Many modifications of the above embodiments can be made without departing from the spirit of the present invention.

What is claimed is:

1. A stabilizing mechanism for output torque of a transmission member, comprising:

a transmission member including a force-input section and a force-output section which are separated from each other, the force-output section has an annular end section and a cylindrical outer cap body, the cylindrical outer cap body has a chucking hole with non-circular cross-section being formed at a bottom end of thereof and communicating with an interior of the annular end section, the chucking hole axially inward extending from the bottom end of the outer cap body by a predetermined depth;

an engaging member positioned between the force-input section and the force-output section, the engaging member including a first engaging section and a second engaging section, the engaging member has a chucking column located on a first end thereof and the first engaging section located on a top end face of the force-input section, the second engaging section is located on a second end of the engaging member and located opposite the chucking column, the first engaging section and the second engaging section being engaged with each other by a predetermined engagement depth for transmitting force from the force-input section to the force-output section, the inner chucking column is coaxially slidably inserted into the chucking hole, the inner chucking column having a cross-sectional shape corresponding to a shape of the chucking hole; and a resilient member for providing resilient force to keep the first engaging section engaging the second engaging section, the resilient member being compressible under force, the resilient member having a compressible distance shorter than the engagement depth of the first engaging section and the second engaging section;

wherein the compressible distance of the resilient member limiting a rotation of the first engaging section relative to the second engaging section;

wherein the annular end section of the force-input section covering the resilient member, the first engaging section and the second engaging section.

2. The stabilizing mechanism for output torque of the transmission member as claimed in claim 1, wherein the force-input section substantially has a form of cylindrical shaft.

3. The stabilizing mechanism for output torque of the transmission member as claimed in claim 2, wherein the force-output section substantially has a form of cylindrical shaft, the force-input section and the force-output section being coaxially arranged, one end of the force-input section being opposite to one end of the force-output section, the force-output section being axially movable relative to the force-input section.

4. The stabilizing mechanism for output torque of the transmission member as claimed in claim 1, wherein each of the first engaging section and the second engaging section is composed of multiple ratchets arranged at intervals, each ratchet of the second engaging section being inserted between two adjacent ratchets of the first engaging section;

wherein the resilient member preventing the multiple ratchets of the first engaging section from rotating past the multiple ratchets of the second engaging section.

5. The stabilizing mechanism for output torque of the transmission member as claimed in claim 4, wherein each ratchet has at least one inclined tooth face on one side, the inclined tooth faces of the ratchets of the second engaging section respectively abutting against the inclined tooth faces of the corresponding ratchets of the first engaging section.

6. The stabilizing mechanism for output torque of the transmission member as claimed in claim 1, wherein the resilient member having a first end pressing against the bottom end surface of the outer cap body and a second end pressing against a seat of the engaging member, the seat is located between the inner chuck column and the second engaging section of the engaging member, one end of the annular end section being fixedly connected with one end of the outer cap body, the annular end section being spaced from the force-input section by a predetermined distance and separated from the seat, the resilient member further including a resilient section positioned between the seat and the bottom end surface of the outer cap body, the resilient section serving to provide resilient force which is transmitted from the seat through the force-output section to the engaging member, the resilient section having a compressible distance shorter than the engagement depth of the first engaging section and the second engaging section.

7. The stabilizing mechanism for output torque of the transmission member as claimed in claim 6, wherein a first annular groove is formed around an interior periphery of an interior wall of the annular end section and a second annular groove is formed around an exterior periphery of the force-input section, the first annular groove and the second annular groove having a same curvature center and being positioned opposite to each other, a plurality of balls being rollably held in the first annular groove and the second annular groove.

* * * * *